US008009386B2

(12) United States Patent
Hachisuka (10) Patent No.: US 8,009,386 B2
(45) Date of Patent: Aug. 30, 2011

(54) MAGNETIC TAPE HEAD WITH MAGNETIC HEAD LAYER FORMED ON BASE SUBSTRATE

(75) Inventor: Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 946 days.

(21) Appl. No.: 11/984,969

(22) Filed: Nov. 26, 2007

(65) Prior Publication Data
US 2009/0135520 A1    May 28, 2009

(51) Int. Cl.
*G11B 5/187* (2006.01)
(52) U.S. Cl. ....................................................... 360/122
(58) Field of Classification Search ............. 360/119.01, 360/121, 122
See application file for complete search history.

(56) References Cited

U.S. PATENT DOCUMENTS

| | | | | |
|---|---|---|---|---|
| 4,797,767 A | * | 1/1989 | Baus, Jr. ........................ | 360/121 |
| 4,849,841 A | * | 7/1989 | Sokolik ..................... | 360/123.17 |
| 5,345,354 A | * | 9/1994 | Ito et al. ......................... | 360/121 |
| 5,394,285 A | * | 2/1995 | Dee et al. ....................... | 360/121 |
| 5,423,116 A | * | 6/1995 | Sundaram ..................... | 29/603.1 |
| 5,678,086 A | * | 10/1997 | Gandola et al. .............. | 396/319 |
| 5,883,770 A | * | 3/1999 | Biskeborn et al. ........ | 360/130.21 |
| 6,191,919 B1 | * | 2/2001 | Cates et al. .............. | 360/130.21 |
| 6,580,586 B1 | * | 6/2003 | Biskeborn ..................... | 360/319 |
| 6,879,470 B2 | | 4/2005 | Johnson et al. | |
| 6,915,559 B1 | * | 7/2005 | Schwartz et al. .......... | 29/603.14 |
| 7,477,482 B2 | * | 1/2009 | Biskeborn et al. ............ | 360/121 |
| 7,646,565 B2 | * | 1/2010 | Biskeborn et al. ............ | 360/129 |
| 7,733,603 B2 | * | 6/2010 | Dee ................................ | 360/122 |
| 2003/0016474 A1 | * | 1/2003 | Biskeborn ..................... | 360/319 |
| 2004/0136119 A1 | * | 7/2004 | Kirschenbaum et al. ..... | 360/317 |
| 2007/0035877 A1 | * | 2/2007 | Maejima et al. .............. | 360/122 |
| 2007/0103812 A1 | * | 5/2007 | Biskeborn et al. ............ | 360/122 |

FOREIGN PATENT DOCUMENTS

| | | |
|---|---|---|
| JP | A-07-153217 | 6/1995 |
| JP | A-11-353631 | 12/1999 |
| JP | A-2001-118220 | 4/2001 |
| JP | A-2003-203321 | 7/2003 |
| JP | A-2003-288710 | 10/2003 |
| JP | A-2005-259198 | 9/2005 |

* cited by examiner

*Primary Examiner* — Brian Miller
(74) *Attorney, Agent, or Firm* — Oliff & Berridge, PLC

(57) ABSTRACT

A magnetic tape head has a base substrate, a magnetic head layer formed on the base substrate, and a closure piece formed on the magnetic head layer. The distance from a first plane comprising a point on the tape bearing surface of the base substrate to a third plane comprising a point on the tape bearing surface of the closure piece is equal to or greater than the distance from the first plane to a second plane comprising a point on the tape bearing surface of the magnetic head layer.

7 Claims, 12 Drawing Sheets

MAGNETIC TAPE HEAD WITH MAGNETIC HEAD LAYER FORMED ON BASE SUBSTRATE

BACKGROUND OF THE INVENTION

1. Field of the Invention

This invention relates to a magnetic tape head for use in tape head drives.

2. Related Background Art

Improvements in tape head drive performance in recent years have been accompanied by demands for improvements in magnetic tape head performance. To this end, hybrid thin film magnetic heads, comprising recording heads having inductive-type electromagnetic transducing elements and playback heads having magnetoresistance (MR) elements for reading, have come into widespread use.

Magnetic tape heads of the prior art are for example disclosed in Japanese Patent Laid-open No. 2005-259198,Japanese Patent Laid-open No. 2003-203321,Japanese Patent Laid-open No. 2003-288710,Japanese Patent Laid-open No. 2001-118220,Japanese Patent Laid-open No. 07-153217, Japanese Patent Laid-open No. 11-353631,and U.S. Pat. No. 6,879,470.

Figure 12:
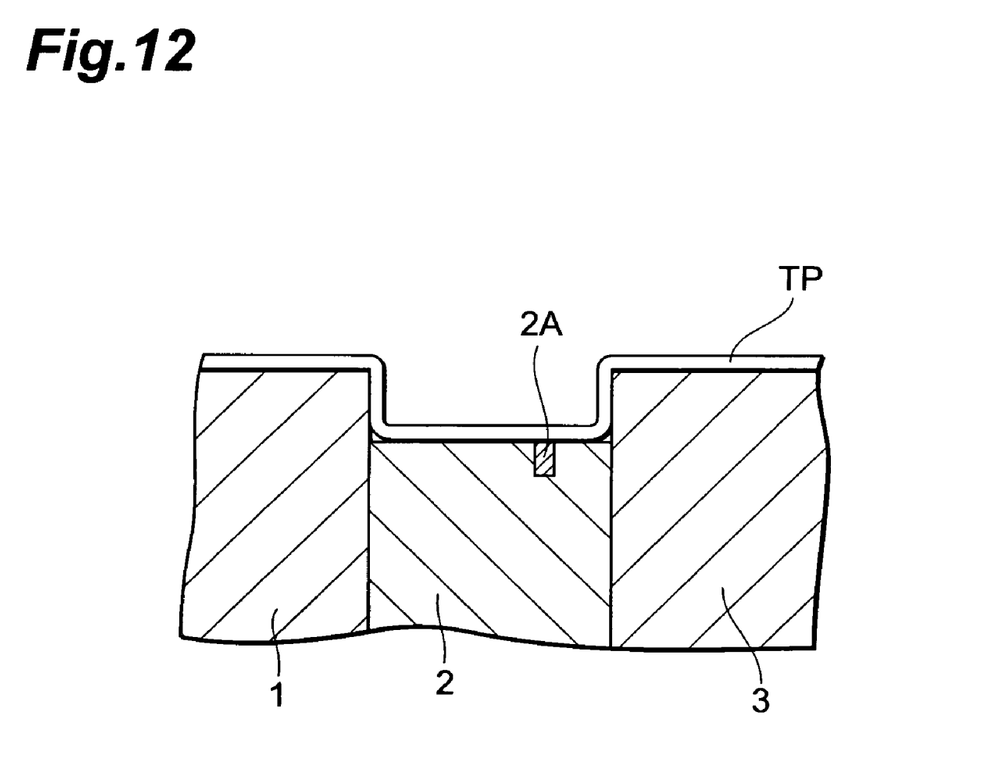

FIG. 12 is a cross-sectional view of such a magnetic tape head of the prior art.

A magnetic head layer 2 is formed on a conductive base substrate 1; the surface of the magnetic head layer 2 is formed by covering with a closure piece 3. The magnetic head layer 2 has internally a magnetic element 2A, comprising a playback head which is an MR (magnetoresistive) element and a recording head. The tape bearing surface (TBS) of the magnetic head layer 2 is recessed from the surface of the base substrate 1 opposing the magnetic tape TP, and the tape bearing surface is recessed from the surface of the closure piece 3 opposing the magnetic tape TP, forming a recessed structure in which the tape bearing surface is depressed relative to the surroundings.

SUMMARY OF THE INVENTION

In the case of a magnetic tape head construction of the prior art, the magnetic tape TP travels over the head element portions comprising the closure piece/head element portion/closure piece (base substrate) without bending. Even if the magnetic tape TP itself travels while bending, the head element portion is not eroded as a result. However, if the magnetic tape is abraded due to travel, abrasion residue of the magnetic tape and other dust occurs. This dust may remain in the head element portion, and so there is the problem that the head element portion is eroded as a consequence.

In this magnetic tape head, the closure piece is recessed from the tape bearing surface of the magnetic head layer. That is, this magnetic tape head has a base substrate, a magnetic head layer formed on the base substrate, and a closure piece formed on the magnetic head layer, and has the following relationship.

Taking the thickness direction of the magnetic head layer to be the Y-axis direction, the length direction of the closure piece to be the X-axis direction, and the direction perpendicular to both the X-axis direction and to the Y-axis direction to be the Z-axis direction, an XYZ orthogonal coordinate system is set. When the XY plane passing through a point on the tape bearing surface of the base substrate, positioned at the boundary between the base substrate and the magnetic head layer, is taken to be a first plane, the XY plane passing through a point on the tape bearing surface of the magnetic head layer, positioned at the boundary between the base substrate and the magnetic head layer, is taken to be a second plane, and the XY plane passing through a point on the tape bearing surface of the closure piece, positioned at the boundary between the magnetic head layer and the closure piece, is taken to be a third plane, then a first distance between the first plane and the third plane is equal to or greater than a second distance between the first plane and the second plane.

In this case, because the closure piece is recessed, dust generated from the magnetic tape moves easily, and so the magnetic head layer is not readily eroded. Further, the magnetic head layer and magnetic tape are brought closer according to this recess, so that playback and recording precision is improved. Further, the closure piece can be mounted onto the base substrate afterward, so that the step difference can be adjusted at the time of mounting, and can be adjusted according to the circumstances of the distance between magnetic head layer and magnetic tape.

In particular, when a protective film is provided on the tape bearing surface, the tape bearing surface is further protected by the protective film. As such a protective film, diamond-like carbon (DLC) or $Al_2O_3$ can be used. As the playback head of the magnetic tape head, if a giant magnetoresistive (GMR) element or a tunnel magnetoresistive (TMR) element is used, high playback output can be obtained. In such magnetoresistance effect elements, easily corroded material is used, and so by adding a protective film, corrosion can be suppressed.

It is preferable that the line of intersection of a YZ plane and the closure piece tape bearing surface comprise a curve which is distended in a direction moving away from the closure piece, and that the line of intersection of the YZ plane and the base substrate tape bearing surface comprise a curve which is distended in a direction moving away from the base substrate.

When a protective film is provided on the tape bearing surfaces of the closure piece and base substrate, it is preferable that the line of intersection of the YZ plane and the exposed surface of the protective film on the closure piece comprise a curve which is distended in a direction moving away from the closure piece, and that the line of intersection of the YZ plane and the exposed surface of the protective film on the base substrate comprise a curve which is distended in a direction moving away from the base substrate.

In this case, the magnetic tape travels over the distended curves, so that travel is smooth.

When the magnetic head layer comprises a plurality of magnetic elements, if a protective guide wall is provided, standing erect orthogonally from the tape bearing surface between the magnetic elements, then by causing the magnetic tape to travel over the top surface of this guide wall, the tape bearing surface is protected from the magnetic tape. When a protective film is provided on the tape bearing surface, the top surface of the guide wall prevents the magnetic tape from making direct contact with the protective film, so that the lifetime of the protective film is extended.

Further, a method for manufacturing the magnetic tape head comprises a process of preparing a base substrate; a process of forming a magnetic head layer, having a plurality of magnetic elements, on the base substrate; a process of positioning a closure piece on the magnetic head layer; a process of forming a protective film on the tape bearing surface of the magnetic head layer, on the tape bearing surface of the base substrate adjacent to this tape bearing surface, and on the tape bearing surface of the closure piece adjacent to the tape bearing surface of the magnetic head layer; and, a process of abrading the protective film such that a portion of the protective film remains on the tape bearing surface of the magnetic head layer; and is characterized in that the distance from the tape bearing surface of the base substrate to the tape bearing surface of the closure piece is equal to or greater than the distance from the tape bearing surface of the base substrate to the tape bearing surface of the magnetic head layer.

By means of the above abrading, the traveling surface of the magnetic tape becomes smooth, and moreover a portion of the protective film remains on the tape bearing surface, so that the tape bearing surface is protected, and the tape bearing surface of the closure piece is positioned far away, so that dust moves easily, and the magnetic head layer and magnetic tape are brought close, so that playback and recording precision is improved.

DESCRIPTION OF THE PREFERRED EMBODIMENTS

Below, the magnetic tape head of an aspect is explained. The same symbols are used to indicate the same elements, and redundant explanations are omitted.

Figure 1:
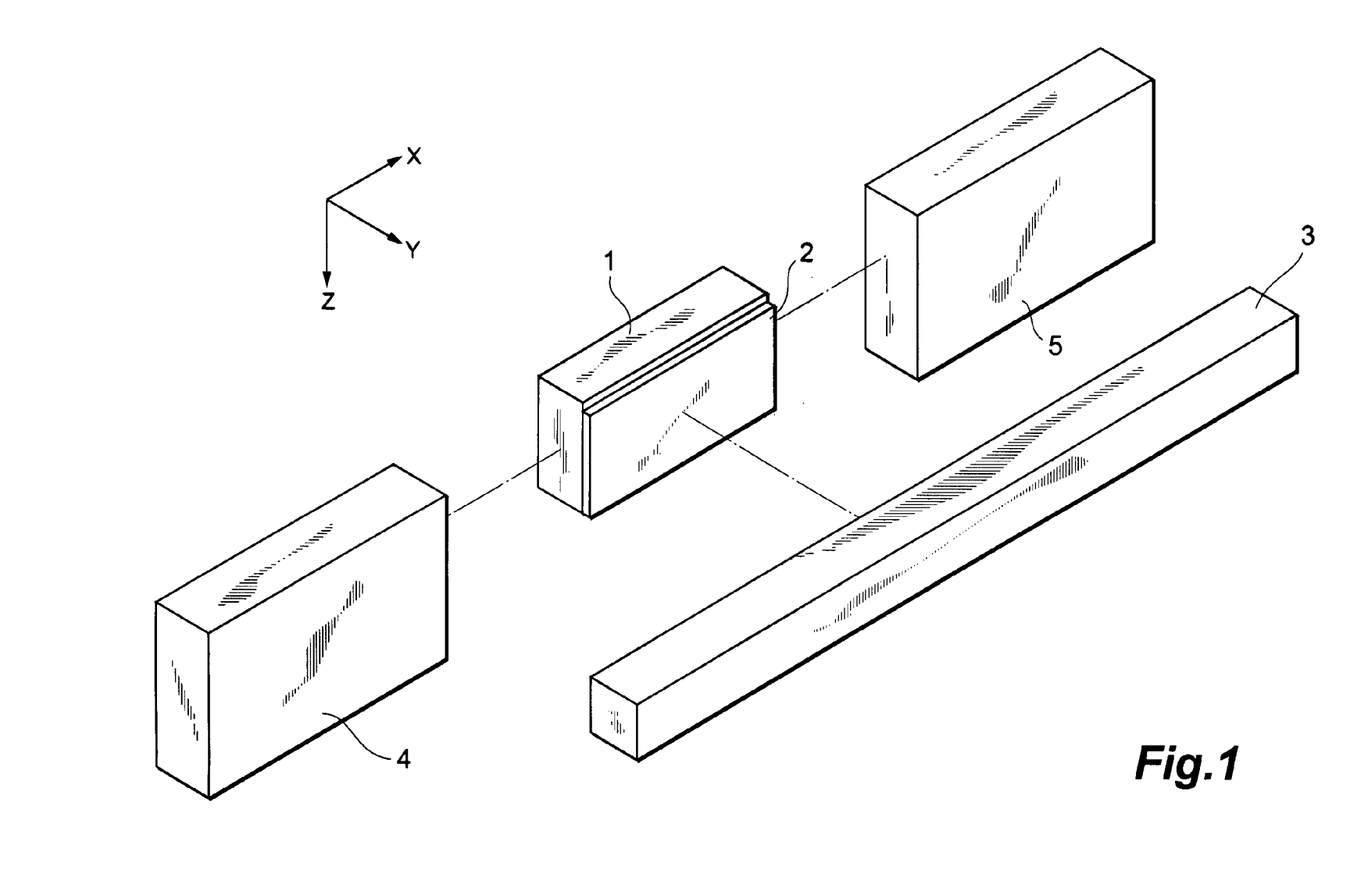
FIG. 1 is an exploded perspective view of a magnetic tape head intermediate member.

FIG. 1 is an exploded perspective view of a magnetic tape head intermediate member.

First, a magnetic head bar (chip), comprising a thin film magnetic head layer 2 formed on a base substrate 1, is prepared. The base substrate 1, closure piece 3, and bar end blocks 4, 5 each comprise AlTiC ($Al_2O_3.TiO_2$), a ceramic ($CaTiO_3$ or similar), or another high-hardness metal or other nonmagnetic material.

Here, an XYZ orthogonal coordinate system is set as shown in the figure. The thickness direction of the base substrate 1 and magnetic head layer 2 is the Y-axis direction, the length direction of the closure piece 3 is the X-axis direction, and the direction perpendicular to the XY plane is the Z-axis direction.

The closure piece 3 is positioned on the magnetic head layer 2 of the magnetic head bar, and the bar end blocks 4, 5 are positioned on either side. Epoxy resin is used to bond the magnetic head bar to the closure piece 3, the magnetic head bar to the bar end blocks 4 and 5, and the closure piece 3 to the bar end blocks 4 and 5. That is, after applying epoxy resin to the opposing faces of each of the elements, the elements are pressed together and are heated in an oven to cure the epoxy resin.

Here, the side face positioned on the upper side of the magnetic head layer 2 in the figure is the tape bearing surface (TBS). That is, the tape bearing surface is opposed to the XY plane. The tape bearing surface of the magnetic head layer 2 is recessed from the surface of the base substrate 1 adjacent to this tape bearing surface. Further, the surface of the closure piece 3 adjacent to the tape bearing surface of the magnetic head layer 2 is also further recessed from the tape bearing surface of the magnetic head layer 2. Hence the juncture portions between the base substrate 1, magnetic head layer 2, and closure piece 3 form step portions.

Figure 2:
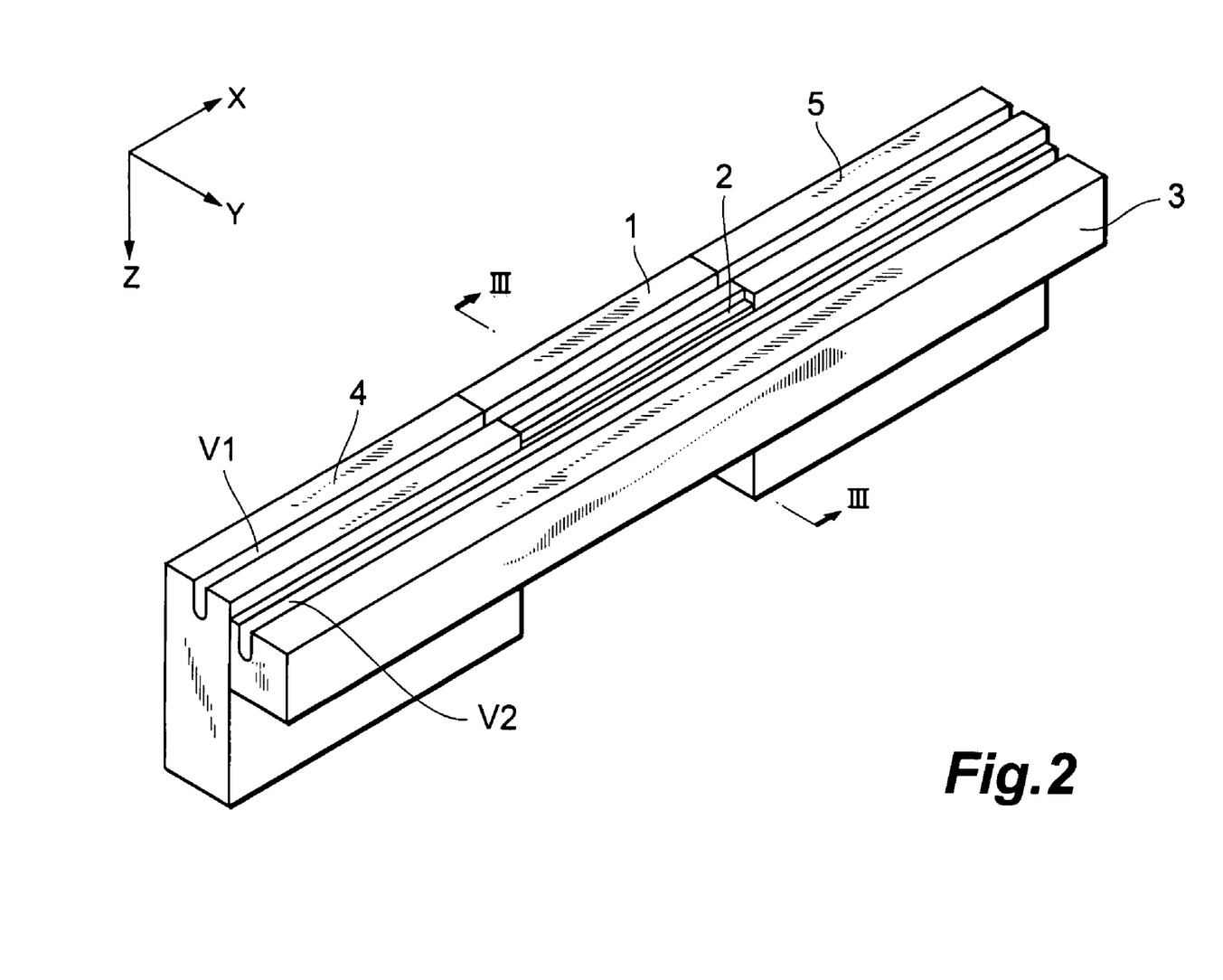
FIG. 2 is a perspective view of a magnetic tape head intermediate member.

FIG. 2 is a perspective view of a magnetic tape head intermediate member.

As explained above, after using epoxy resin to bond the base substrate 1, magnetic head layer 2, closure piece 3, and bar end blocks 4 and 5, two grooves V1, V2 are formed along the length direction of the closure piece 3 (X-axis direction). Groove V1 traverses bar end block 4, base substrate 1, and bar end block 5; groove V2 traverses closure piece 3. The magnetic tape, not shown, travels in the thickness direction of the magnetic head layer 2 (Y-axis direction) over the tape bearing surface, which is the exposed surface of the magnetic head layer 2. The length direction of grooves V1 and V2 (X-axis direction) is perpendicular to the magnetic tape travel direction (substantially the Y-axis direction), and the depth direction of grooves V1, V2 substantially coincides with the magnetic tape thickness direction (Z-axis direction). The grooves V1 and V2 provide means for capturing unwanted matter (dust) occurring during magnetic tape travel.

Figure 3:
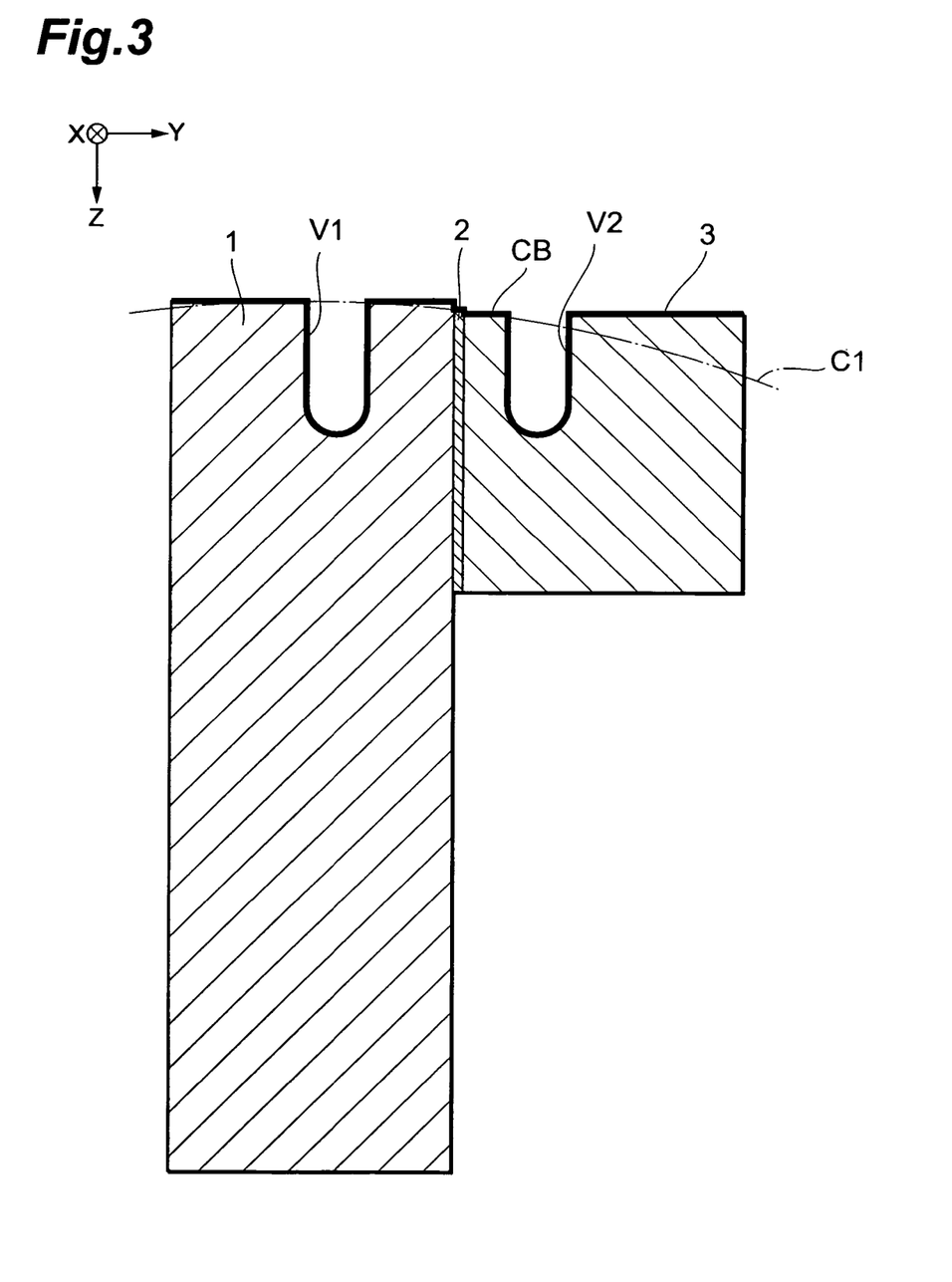
FIG. 3 is a cross-sectional view along arrow III-III of the magnetic tape head intermediate member shown in FIG. 2.

FIG. 3 is a cross-sectional view along arrow III-III of the magnetic tape head intermediate member shown in FIG. 2.

As explained above, after bonding the members together, a protective film CB is provided on the tape bearing surface side of the magnetic tape head intermediate member. That is, the protective film CB covers all the tape bearing surfaces, which are the tape bearing surface of the magnetic head layer 2, the tape bearing surface of the base substrate 1 adjacent to the tape bearing surface of the magnetic head layer 2, and the tape bearing surface of the closure piece 3 adjacent to the tape bearing surface of the magnetic layer 2. The protective film CB in this example comprises diamond-like carbon (DLC) or $Al_2O_3$. As the method of deposition of the protective film CB, a sputtering method or chemical vapor deposition (CVD) can be used.

Then, the tape bearing surface side of the magnetic tape head intermediate member is abraded. This abrasion is performed along the abrasion curve C1 indicated by the dot-dash line in the figure. The abrasion curve C1 is distended in a direction moving away from the tape bearing surface of the magnetic head layer 2, and has a plurality of curve centers. The radius of curvature is smaller in the region in which the abrasion curve C1 intersects the closure piece 3 than the radius of curvature in the region in which the abrasion curve C1 intersects the base substrate 1.

Figure 4:
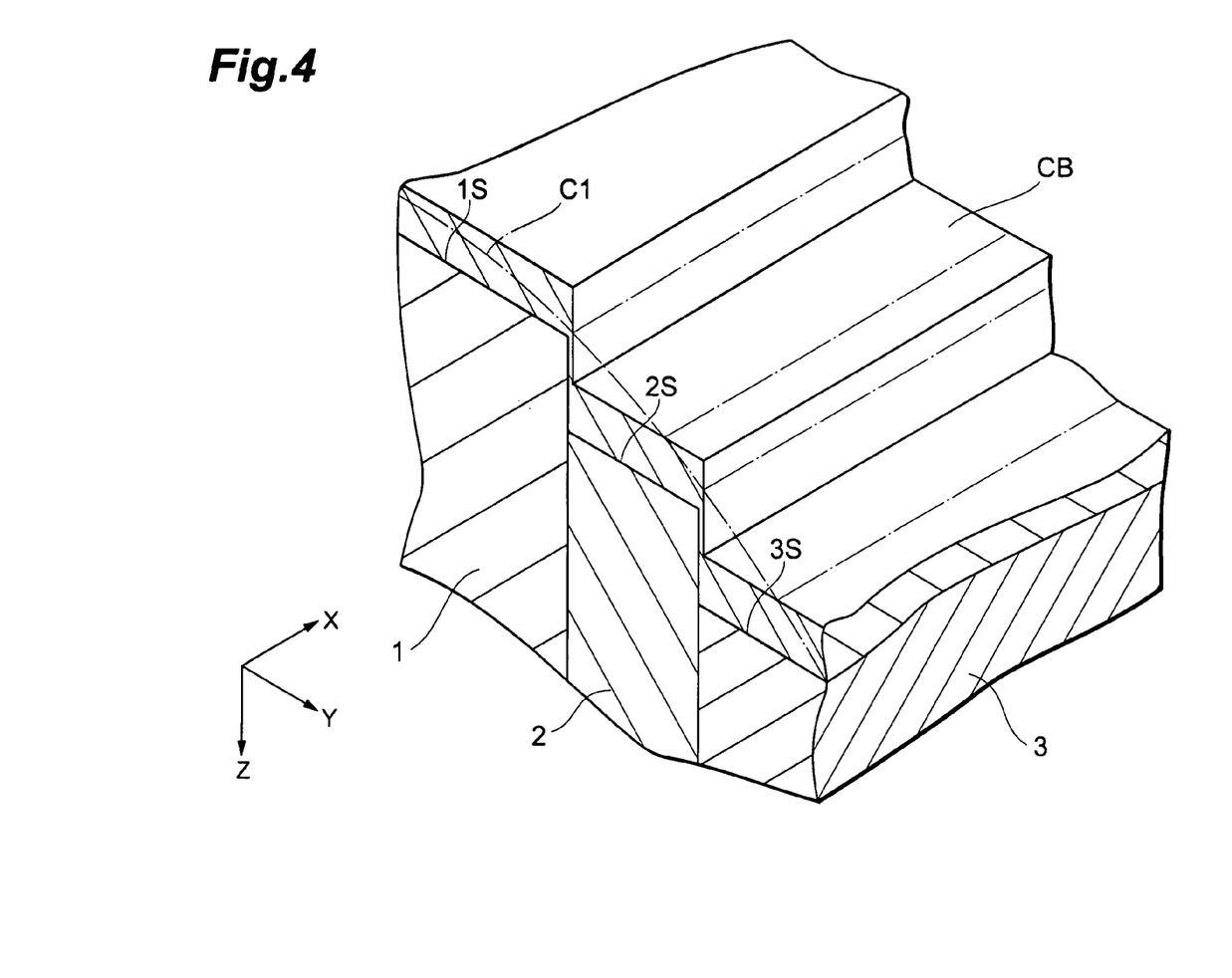
FIG. 4 is an enlarged perspective view of principal portions of a magnetic tape head intermediate member before abrading.

FIG. 4 is an enlarged perspective view of principal portions of a magnetic tape head intermediate member prior to abrading. The base substrate 1 has a tape bearing surface 1S opposing the magnetic tape, not shown, the magnetic head layer 2 has a tape bearing surface 2S opposing the magnetic tape, and the closure piece 3 has a tape bearing surface 3S opposing the magnetic tape. 1S and 3S are each adjacent to the tape bearing surface 2S, and the boundary between the tape bearing surface 1S and tape bearing surface 2S forms a step, while the boundary between the tape bearing surface 3S and the tape bearing surface 2S also forms a step. A protective film CB is formed on the tape bearing surfaces 1S, 2S, 3S. The abrasion curve C1 passes through the protective film CB in the region on the tape bearing surface 1S, through the protective film CB in the region on the tape bearing surface 2S, and through the protective film CB in the region on the tape bearing surface 3S, extending into the closure piece 3.

Figure 5:
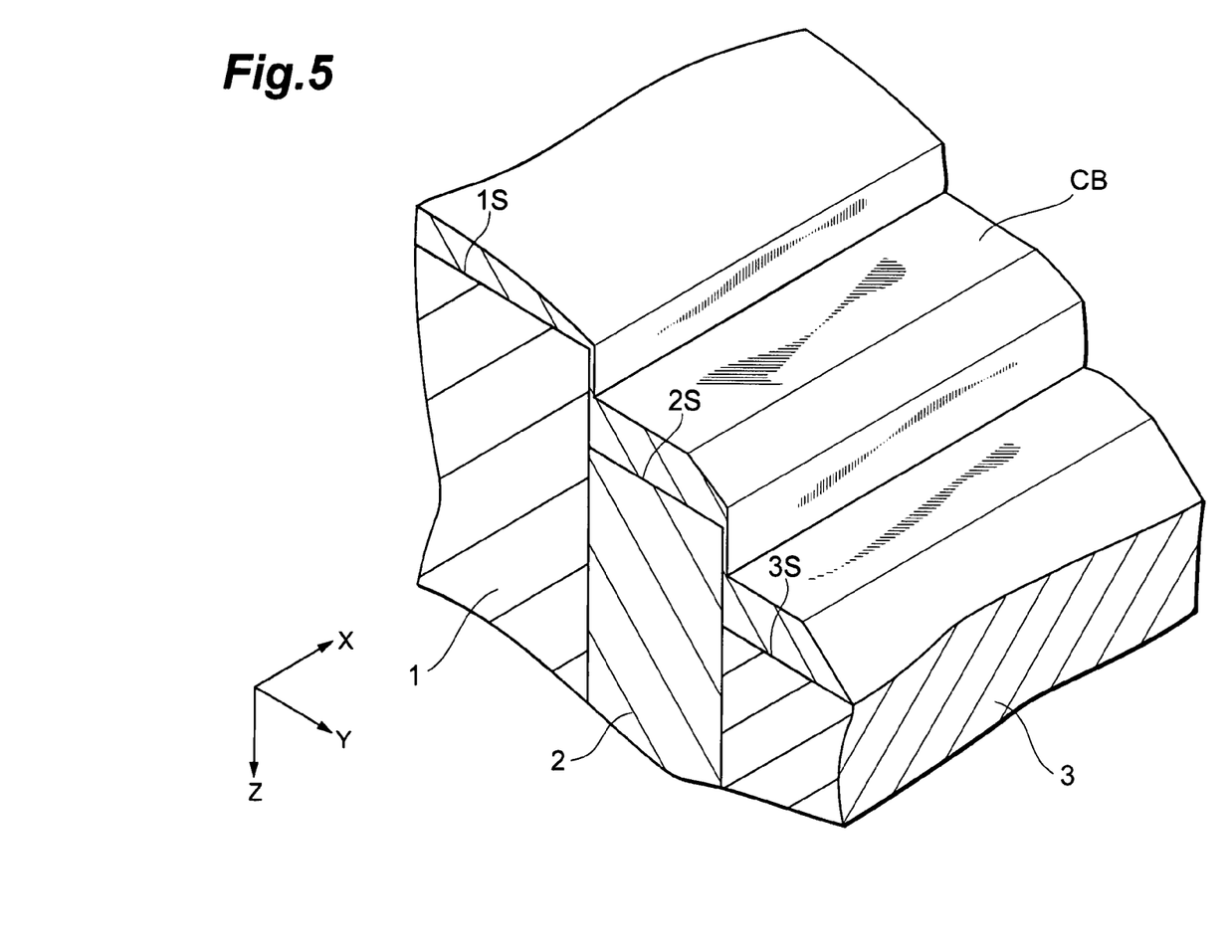
FIG. 5 is an enlarged perspective view of principal portions of a magnetic tape head after abrading.

FIG. 5 is an enlarged perspective view of principal portions of the magnetic tape head after abrasion.

A portion of the protective film CB is abraded, and the thickness is decreased. Various extents of abrasion are conceivable; for example, abrading may be performed to a deep position, such that the protective film CB remains only on the tape bearing surface 2S of the magnetic head layer 2. Further, a portion of the protective film CB on the tape bearing surface 2S may be removed.

Figure 6:
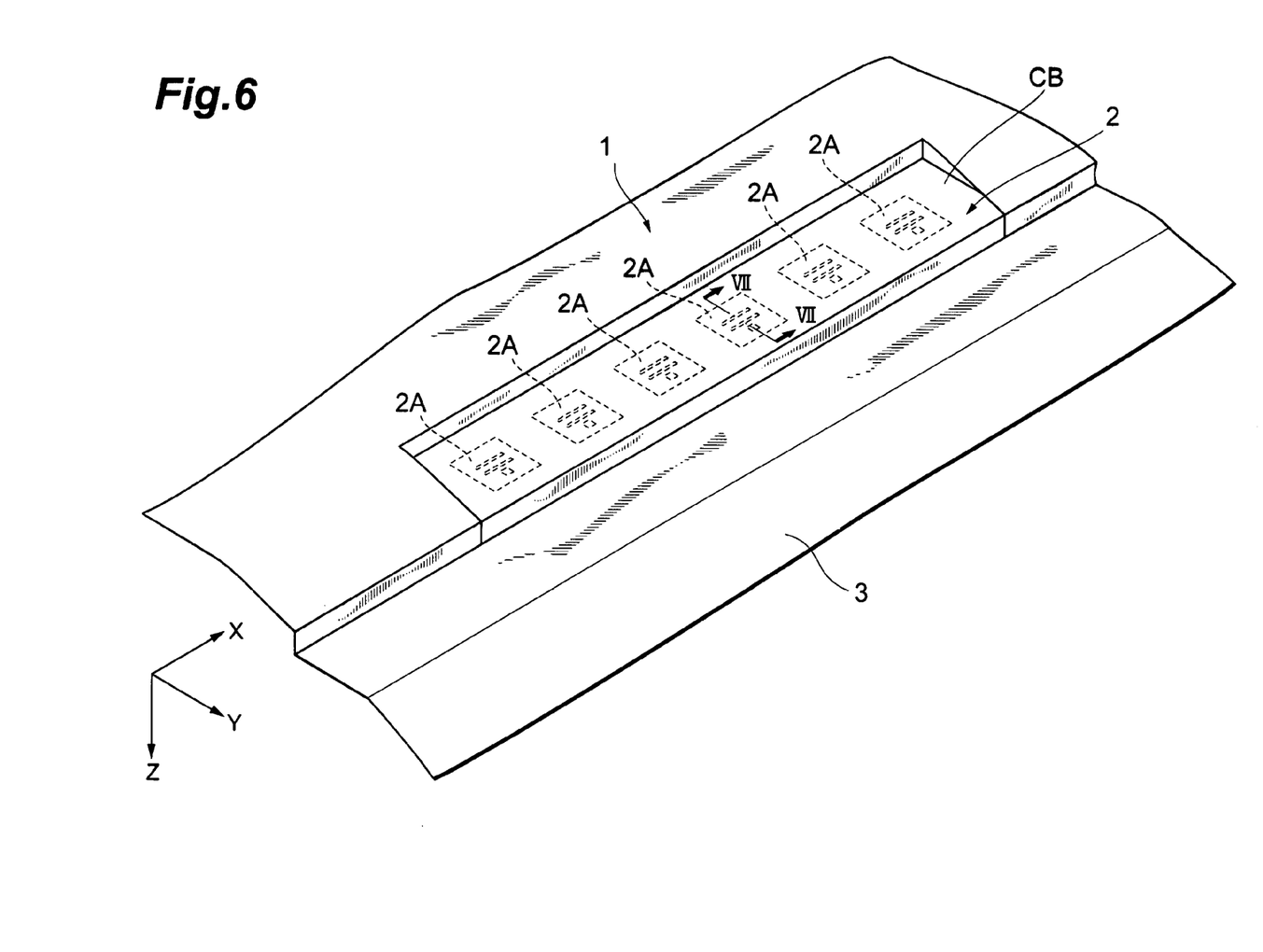
FIG. 6 is an enlarged perspective view of a magnetic tape head, showing principal portions of the magnetic tape head together with magnetic elements.

FIG. 6 is an enlarged perspective view of a magnetic tape head, showing principal portions of the magnetic tape head together with magnetic elements 2A.

The protective film CB covers at least the tape bearing surface of the magnetic head layer 2. In the figure, the protective film CB is also formed on the surface of the base substrate 1 and on a portion the surface of the closure piece 3. The magnetic head layer 2 is formed with a plurality of magnetic elements 2A embedded within an $Al_2O_3$ or other insulating layer. The magnetic tape has multiple tracks. The plurality of magnetic elements 2A are arranged along the track width direction (X-axis direction), and the magnetic elements 2A simultaneously read data stored within magnetic recording regions in tracks on the magnetic tape, or simultaneously write data to the tracks.

In this way, the closure piece 3 is intentionally recessed in the Z-axis direction from the element surface and bonded to the magnetic head layer 2, so that the protective film CB is embedded in the steps, and so the protective film CB can be put into a more stable state.

Figure 7:
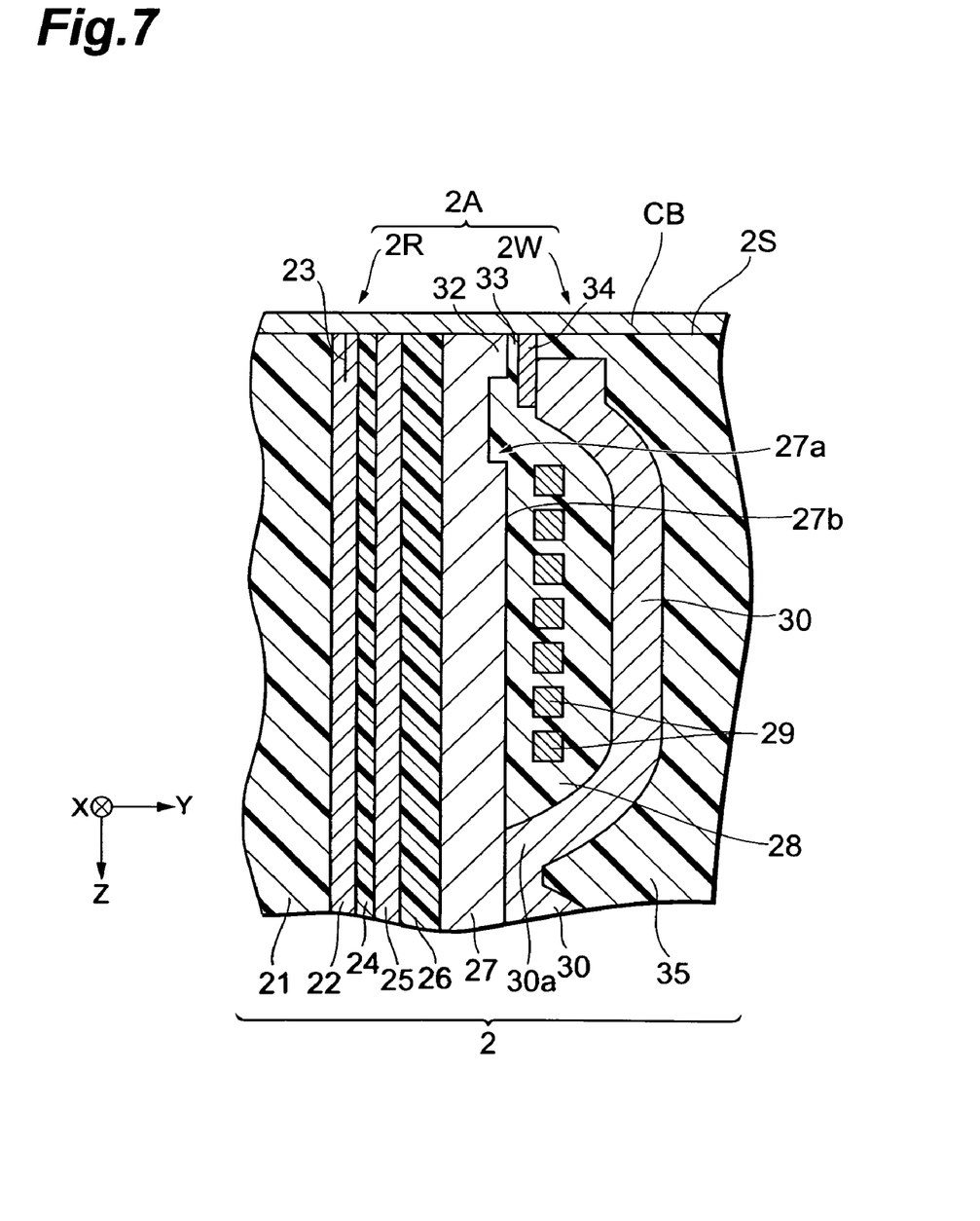
FIG. 7 is a cross-sectional view along arrow VII-VII of the magnetic elements shown in FIG. 6.

FIG. 7 is a cross-sectional view along arrow VII-VII of the magnetic elements shown in FIG. 6.

This cross-section (reference plane) is a YZ plane perpendicular to the track width (X-axis) direction. The side face in which magnetic elements 2A are exposed is the tape bearing surface 2S opposing the magnetic tape (media). Each of the magnetic elements 2A has a recording head (writer) 2W which records information in the magnetic tape, and a playback head (reader) 2R which reads information recorded in the magnetic tape. The reader 2R and writer 2W are separated by a distance along the travel direction (Y-axis direction) of the magnetic tape. The positions of the readers 2R and writers 2W can be interchanged.

On the base substrate is formed an underlayer 21 of $Al_2O_3$, $SiO_2$, or another electrically insulating material, by sputtering or another method; on this underlayer 21 is formed a lower shield layer, not shown, by plating of NiFe (Permalloy) or another soft magnetic alloy material.

On the lower shield layer is formed an MR element 23, such as for example a GMR (giant magnetoresistive) element or a TMR (tunnel magnetoresistive) element, so as to be embedded within insulating films 22, 24 formed by sputtering $Al_2O_3$ or similar. The MR element 23 is formed by layering an MR layered member and similar on a lower insulating film 22 formed on the lower shield layer, and then patterning.

Leads of Cu or similar, not shown, are formed by plating or other means, and the leads are electrically connected to the MR element 23. In addition, a hard bias layer and similar to apply a bias magnetic field to the MR element 23 is formed, as necessary, on both sides in the track width direction. An upper shield layer 25 is formed by forming an NiFe (Permalloy) or other soft magnetic alloy material layer on the insulating film 24 by plating or other means.

A reader 2R comprises a lower shield layer, MR element 23, leads, insulating film 24, and upper shield layer 25.

A nonmagnetic film 26 is formed on the upper shield layer 25; the nonmagnetic film 26 is formed by depositing $Al_2O_3$ or Pt, or similar, on the upper shield layer 25 by sputtering. On the nonmagnetic film 26 is formed the lower pole layer 27, by plating an NiFe (Permalloy) or other soft magnetic material or by other means, and on top of this a coil conductor 29 of Cu or similar is provided, enclosed between a resist material and an insulating layer 28 of $Al_2O_3$ or similar. Thereupon is formed a yoke layer 30 by plating of an NiFe alloy or another soft magnetic alloy material.

On the side of the tape bearing surface 2S, an upper magnetic pole 34 is formed over the lower magnetic pole layer 27, with a write gap layer 33 therebetween. The write gap layer 33 is formed by sputtering $Al_2O_3$, $SiO_2$, or similar. The upper magnetic pole 34 is formed by plating NiFe (Permalloy) or another soft magnetic material.

The upper magnetic pole 34 is magnetically coupled with the yoke layer 30. The lower magnetic pole layer 27 is in contact with the coupling portion 30a of the yoke layer 30 on the side distant from the tape bearing surface 2S, and these are mutually magnetically coupled. The coil conductor 29 is wound in a coil shape about the coupling portion 30a of the yoke layer 30 with the lower magnetic pole layer 27.

A lower magnetic pole protruding portion 32, which protrudes toward the upper magnetic pole 34, is formed integrally on the surface (XZ plane) perpendicular to the thickness direction of the lower magnetic pole layer 27. Here, the lower magnetic pole protruding portion 32 opposes the upper magnetic pole 34. The height of the surface of the deep portion 27b of the lower magnetic pole protruding portion 32 and the height of the surface of the lower magnetic pole protruding portion 32 are the same. The depth T32 of the depressed region 27a can for example be set to 0.1 to 1.0 μm.

An overcoat layer 35 is formed on the yoke layer 30. The overcoat layer 35 is formed by sputtering or otherwise depositing $Al_2O_3$ or $SiO_2$, or similar. A configuration may be employed in which the lower magnetic pole layer 27 also functions as the upper shield layer 25. In this case, of course, the nonmagnetic film 26 is omitted.

Figure 8:
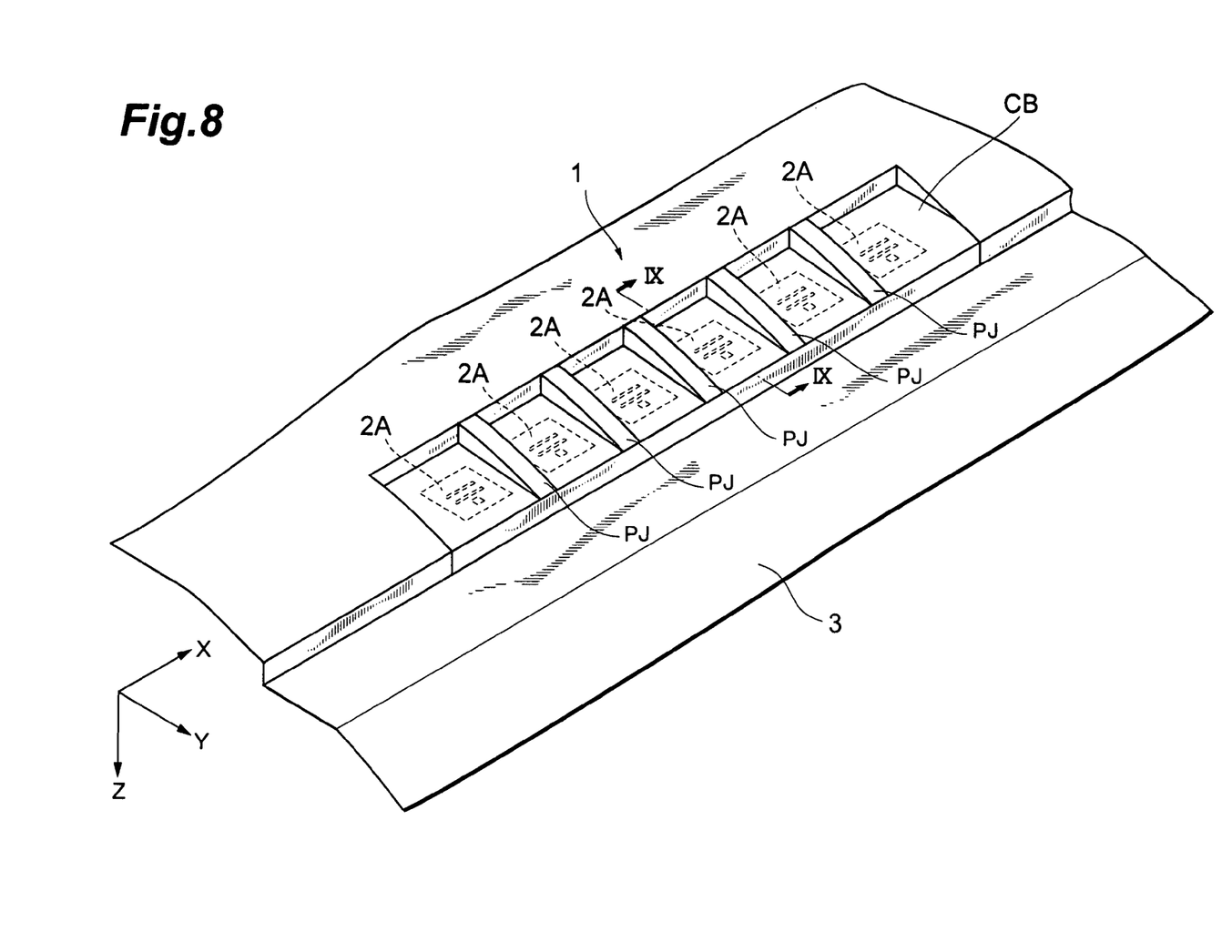
FIG. 8 is an enlarged perspective view of a magnetic tape head, showing principal portions of the magnetic tape head comprising a protective guide wall together with magnetic elements.

FIG. 8 is an enlarged perspective view of a magnetic tape head, showing the principal portions of a magnetic tape head comprising a protective guide wall PJ as well as magnetic elements 2A.

Between the plurality of magnetic elements 2A are provided guide walls PJ to protect the magnetic elements 2A from the magnetic tape. These guide walls PJ are provided erect perpendicularly from the tape bearing surface of the magnetic head layer 2. Each of the guide walls PJ is provided between adjacent magnetic elements 2A; the top face thereof follows the above-described abrasion curve. As the material of the guide walls PJ, the same material as that of the base substrate 1 can be used.

A number of methods are conceivable as methods for forming the guide walls PJ.

A first formation method is a method in which, in the stage of forming the magnetic head layer 2, an appropriate mask is formed on the base substrate 1, and by embedding a guide wall material in this mask, the guide walls PJ are deposited between magnetic elements 2A, after which the mask is removed.

A second formation method is a method in which the magnetic head layer 2 is formed without forming guide walls PJ, after which a mask is formed on the tape bearing surface having apertures in guide wall formation regions, and a guide wall material is deposited onto the tape bearing surface through this mask, after which the mask is removed.

A third formation method is a method in which, after forming the magnetic head layer 2 on the base substrate 1, the regions of the tape bearing surface in which the magnetic elements 2A were formed are subjected to machining, abrading, chemical etching or milling, and, by not subjecting the regions between the magnetic elements 2A to these processes, the constituent material of the magnetic head layer 2 is caused to remain, forming guide walls PJ.

Guide walls PJ are provided on both sides in the track width direction (X-axis direction) of the magnetic elements 2A, and a step in the base substrate 1 is present on one remaining side (the edge in the negative Y-axis direction), so that the magnetic tape is supported by and travels over the top faces of the guide walls PJ, the surface of the base substrate 1 (the protective film CB thereupon), and the surface of the closure piece 3 (the protective film CB thereupon). Because the magnetic elements 2A have a construction in which the periphery is surrounded by guide walls and a step, the magnetic elements 2A are further protected from the magnetic tape.

Tension is applied to the magnetic tape in the travel direction; the magnetic tape has properties such that, when a site comprising soft material is eroded, the tape travels along this shape, and abrasion is concentrated at the weaker areas among the head constituent materials. In this aspect, guide walls PJ are provided along the magnetic tape travel direction, and the guide walls PJ suppress contact of the magnetic tape with the protective film CB on the tape bearing surface. Hence the distance between magnetic tape and magnetic elements 2A can be held constant. Further, because guide walls PJ are provided, scattering to the outside of eroded protective film material and abrasion of the magnetic head as abrading residue can be suppressed.

Thus when a plurality of magnetic elements 2A are comprised by the magnetic head layer 2, if a plurality of guide walls PJ for protection are provided between the magnetic elements 2A then the magnetic tape travels over the top faces PJS (see FIG. 9) of the guide walls PJ, and the tape bearing surface 2S is protected from the magnetic tape. When a protective film CB is provided on the tape bearing surface 2S, the guide walls PJ prevent the magnetic tape from making direct contact with the protective film CB, so that the lifetime of the protective film CB is improved.

Figure 9:
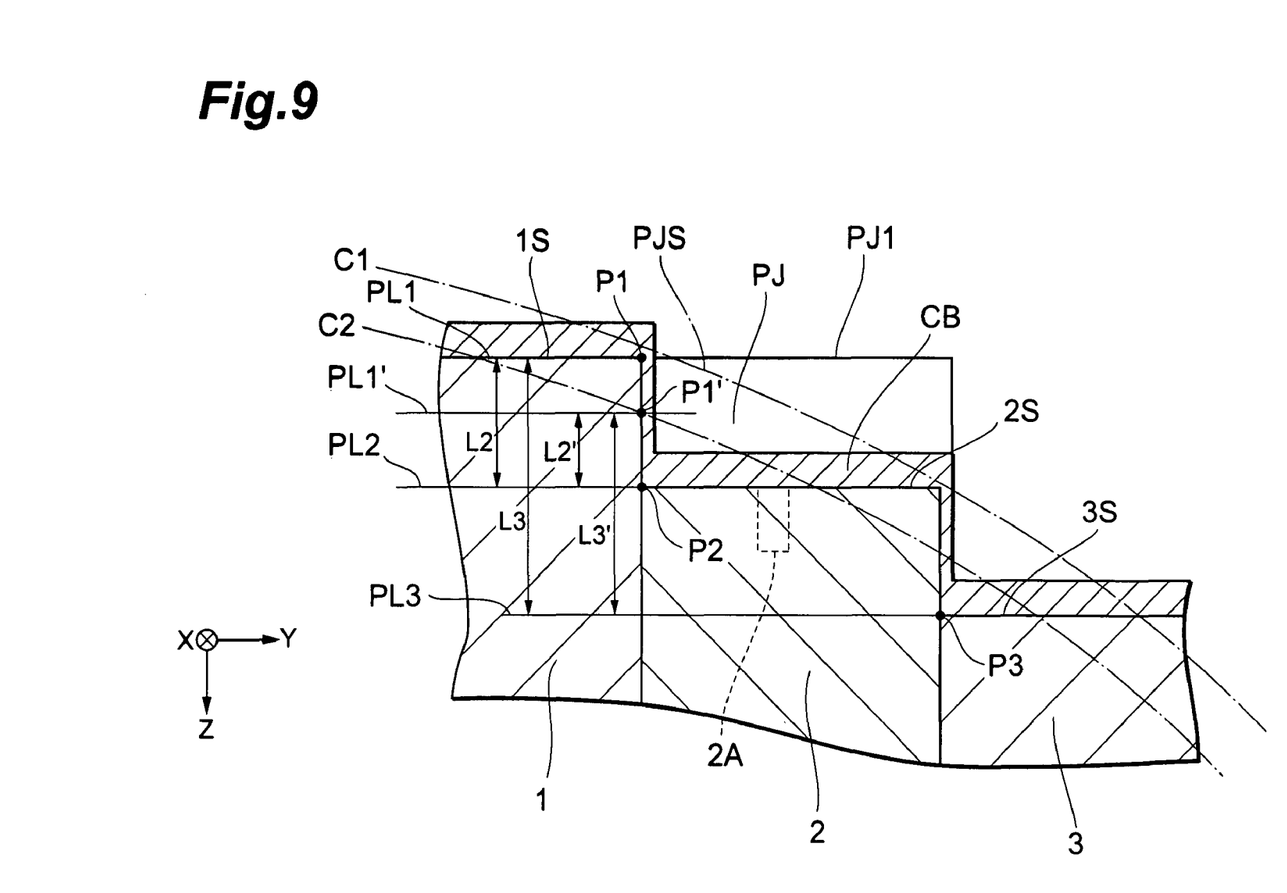
FIG. 9 is a cross-sectional view along arrow IX-IX of the step portion of the magnetic tape head shown in FIG. 8.

FIG. 9 is a cross-sectional view along arrow IX-IX of the step portion of the magnetic tape head shown in FIG. 8.

In the drawing, the guide walls prior to the abrading process PJ1 are shown. When the magnetic tape head intermediate member is abraded according to the abrasion curve C1, the magnetic tape head shown in FIG. 8 is obtained.

In the case of a magnetic tape head manufactured by performing abrasion along the abrasion curve C1, the magnetic tape travels along this curve C1. That is, in this case, the magnetic tape travels while making slight contact with the protective film CB on the base substrate 1, the protective film CB on the magnetic head layer 2, and the protective film CB on the closure piece 3.

When abrading to a still deeper position, that is, in the case of a magnetic tape head manufactured by performing abrasion along abrasion curve C2, the magnetic tape travels along this curve C2. That is, in this case the magnetic tape travels while making slight contact with the exposed surface comprising point P1' on the base substrate 1, the surface of the protective film CB on the magnetic head layer 2 and the exposed surface, and the surface of the protective film CB on the closure piece 3 and the exposed surface.

In a YZ plane, points P1, P1' are on the tape bearing surface 1S on the base substrate 1 positioned at the boundary between the base substrate 1 and magnetic head layer 2. The positions of these points P1, P1' differ depending on the abrasion amount. Further, point P2 is the point on the tape bearing surface 2S of the magnetic head layer 2 positioned at this boundary. Point P3 is the point on the tape bearing surface 3S of the closure piece 3 positioned at the boundary between the magnetic head layer 2 and the closure piece 3. The XY planes passing through these points P1, P1', P2, P3 are respectively PL1, PL1', PL2, and PL3. The tape bearing surfaces S1, S2, S3 can be, in addition to planes, cylindrical surfaces or other curved surfaces.

The magnetic tape head of the above aspect comprises the following elements, regardless of the presence or absence of guide walls PJ. That is, the magnetic tape head comprises a base substrate 1, magnetic head layer 2 formed on the base substrate 1, and closure piece 3 formed on the magnetic head layer 2; a first distance (L3) from the first plane PL1 to the third plane PL3 is greater than a second distance (L2) from the first plane PL1 to the second plane PL2. In the figure, the position of the magnetic tape is indicated by the abrasion curve C1.

This relation is unchanged before and after abrasion. The thickness of the protective film CB is as a rule constant, and this relation obtains regardless of whether or not a protective film CB is present.

When abrading along the abrasion curve C1, although the protective film CB is eroded, there is almost no erosion of the base substrate 1, and the above-described relation L3>L2 obtains.

When abrading along abrasion curve C2, the first plane PL1 becomes the first plane PL1'. In this case also, the first distance (L3') from the first plane PL1' to the third plane PL3 is greater than the second distance (L2') from the first plane PL1' to the second plane PL2.

In the case of the above construction, the closure piece is recessed, so that dust generated from the magnetic tape moves easily, and hence the magnetic head layer 2 is not easily eroded. Further, the magnetic head layer 2 and magnetic tape are brought closer according to this recess, so that playback and recording precision is improved. Also, the closure piece 3 can be mounted on the base substrate 1 afterward, so that the step amount at the time of mounting can be adjusted, and the distance between magnetic head layer 2 and magnetic tape can be adjusted according to circumstances.

In particular, a protective film CB is provided on the tape bearing surface 2S, so that the tape bearing surface 2S is further protected by the protective film CB. When a GMR element or TMR element is used as the reader of a magnetic element 2A, high playback output can be obtained; but easily corroded Fe and other materials are used in the magnetoresistance effect element. In this example, the tape bearing surface 2S is protected from the outside air by the protective film CB, so that corrosion can be suppressed.

When a protective film CB is not provided, the line of intersection of a YZ plane and the tape bearing surface 3S of the closure piece 3 comprises a curve (C2) distended in a direction moving away from the closure piece 3, and the line of intersection of a YZ plane and the tape bearing surface 1S of the base substrate 1 comprises a curve (C2) distended in a direction moving away from the base substrate 1.

Further, when a protective film CB is provided on the tape bearing surfaces of the closure piece 3 and base substrate 1, the line of intersection of a YZ plane and the exposed surface of the protective film CB on the closure piece 3 comprises a curve (C1 or C2) which is distended in a direction moving away from the closure piece 3, and the line of intersection of a YZ plane with the exposed surface of the protective film CB on the base substrate 1 comprises a curve (C1 or C2) which is distended in a direction moving away from the base substrate 1.

In this case, the magnetic tape travels over the distended curves, and so the travel is smooth.

Further, a method for manufacturing this magnetic tape head comprises: (1) a process of preparing a base substrate 1; (2) a process of forming a magnetic head layer 2, having a plurality of magnetic elements 2A, on the base substrate 1; (3) a process of positioning a closure piece 3 on the magnetic head layer 2; (4) a process of forming a protective film CB on the tape bearing surface 2S of the magnetic head layer 2, on the tape bearing surface 1S of the base substrate 1 adjacent to the tape bearing surface 2S of the magnetic head layer 2, and on the tape bearing surface 3S of the closure piece 3 adjacent to the tape bearing surface 2S of the magnetic head layer 2; and, (5) a process of abrading the protective film CB such that a portion of the protective film CB remains on the tape bearing surface 2S of the magnetic head layer. The following is a detailed explanation.

(1) Process of Preparation of Base Substrate 1

The base substrate 1 is a nonmagnetic substrate, and is a portion of a wafer. A magnetic head layer is formed on this wafer, and after formation of the magnetic head layer, dicing is performed into bars, comprising a plurality of magnetic heads. The base substrate 1 in this example is of AlTiC.

(2) Magnetic Head Layer Formation Process

Each of the layers shown in FIG. 7 are deposited in sequence onto the base substrate 1. In this deposition, a sputtering method employing the raw materials of the different layers are targets may be employed. The coil conductor 29 comprising a planar coil can be formed by forming a conducting layer on the lower insulating layer 28 in FIG. 7 and then patterning; on this is formed an upper insulating layer 28, after which the yoke layer 30 is formed, and finally an overcoat layer 35 is formed on the yoke layer 30. After formation of the magnetic head layer in this way, the wafer is diced to obtain magnetic head bars.

(3) Closure Piece Positioning Process

As shown in FIG. 1, a resin adhesive is used to affix the closure piece 3 to the magnetic head layer 2 of a magnetic head bar, and a resin adhesive is used to affix bar end blocks 4, 5 to the side faces at both ends in the track width direction of the magnetic head bar.

(4) Protective Film Formation Process

First, when using a sputtering method, a tape magnetic head intermediate member on which a protective film has not been formed is placed in a position opposing a target in the chamber of a sputtering system. Next, carbon is used as the target, and the target is sputtered using Ar gas, so that a diamond-like carbon layer is deposited on the tape bearing surface and on surfaces adjacent thereto.

(5) Abrading Process

This abrading is performed by pressing an abrading wheel against the tape bearing surface and the surfaces adjacent thereto, rotating the wheel, and performing abrasion such that the abrasion curve becomes for example C1 in FIG. 3.

By means of this abrasion, the magnetic tape traveling surface is made smooth, and in addition a portion of the protective film CB remains on the tape bearing surface 2S, so that the tape bearing surface 2S is protected. The tape bearing surface 3S of the closure piece 3 is positioned farther from the tape bearing surface 1S of the base substrate 1 than is the tape bearing surface 2S of the magnetic head layer 2, and as explained above, the magnetic tape travels smoothly, and the protective film CB and magnetic elements 2A are protected.

In the above, abrasion was performed after formation of the protective film; but the abrasion process can also be performed before formation of the protective film.

Figure 10:
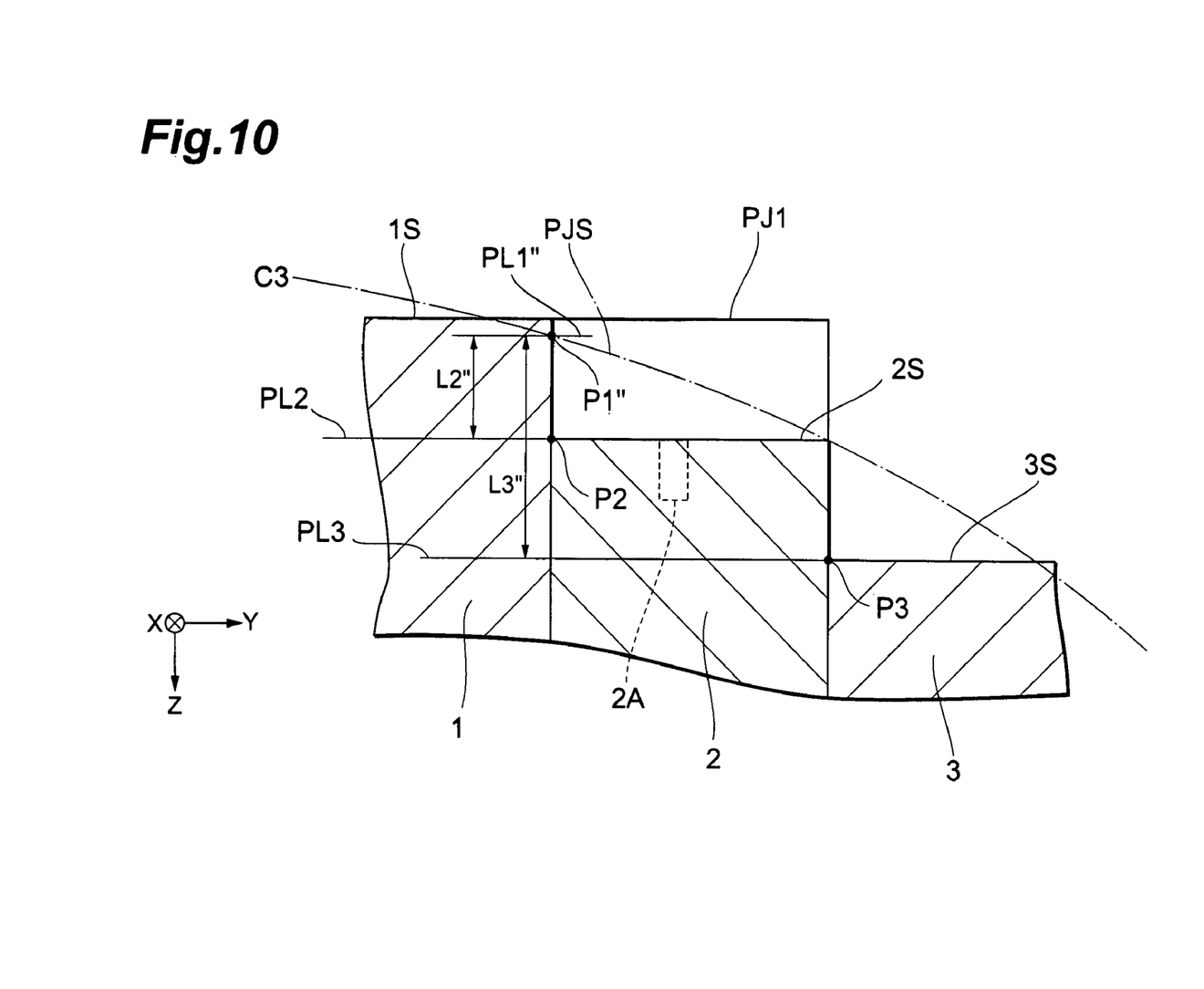
FIG. 10 is a cross-sectional view of the step portion of a magnetic tape head intermediate body in a modified example.

FIG. 10 is a cross-sectional view of the step portion of a magnetic tape head intermediate member in a modified example.

The above-described protective film is not provided on the surface of the magnetic tape head intermediate member, and in this state the magnetic tape head intermediate member is abraded along the abrasion curve C3. The pre-abrasion guide walls PJ1 stand erect perpendicularly in the −Z direction from the tape bearing surface 2S. In this abrasion process, abrasion of the base substrate 1, guide walls PJ1, and closure piece 3 is performed along the abrasion curve C3.

Even in such cases when there is no protective film, the first distance (L3") is greater than the second distance (L2").

The first distance (L3") is the distance between the first plane PL1" and the third plane PL3, and the second distance (L2") is the distance between the first plane PL1" and the second plane PL2. In a YZ plane, the point on the tape bearing surface 1S after abrasion of the base substrate 1 at the position of the boundary between the base substrate 1 and magnetic layer 2 is point P1", and the XY plane passing through point P1" is the first plane PL1". In this case also, the above-described advantageous results are obtained.

After abrasion, the magnetic tape head can be used without further modification, or a protective film can be formed on top.

Figure 11:
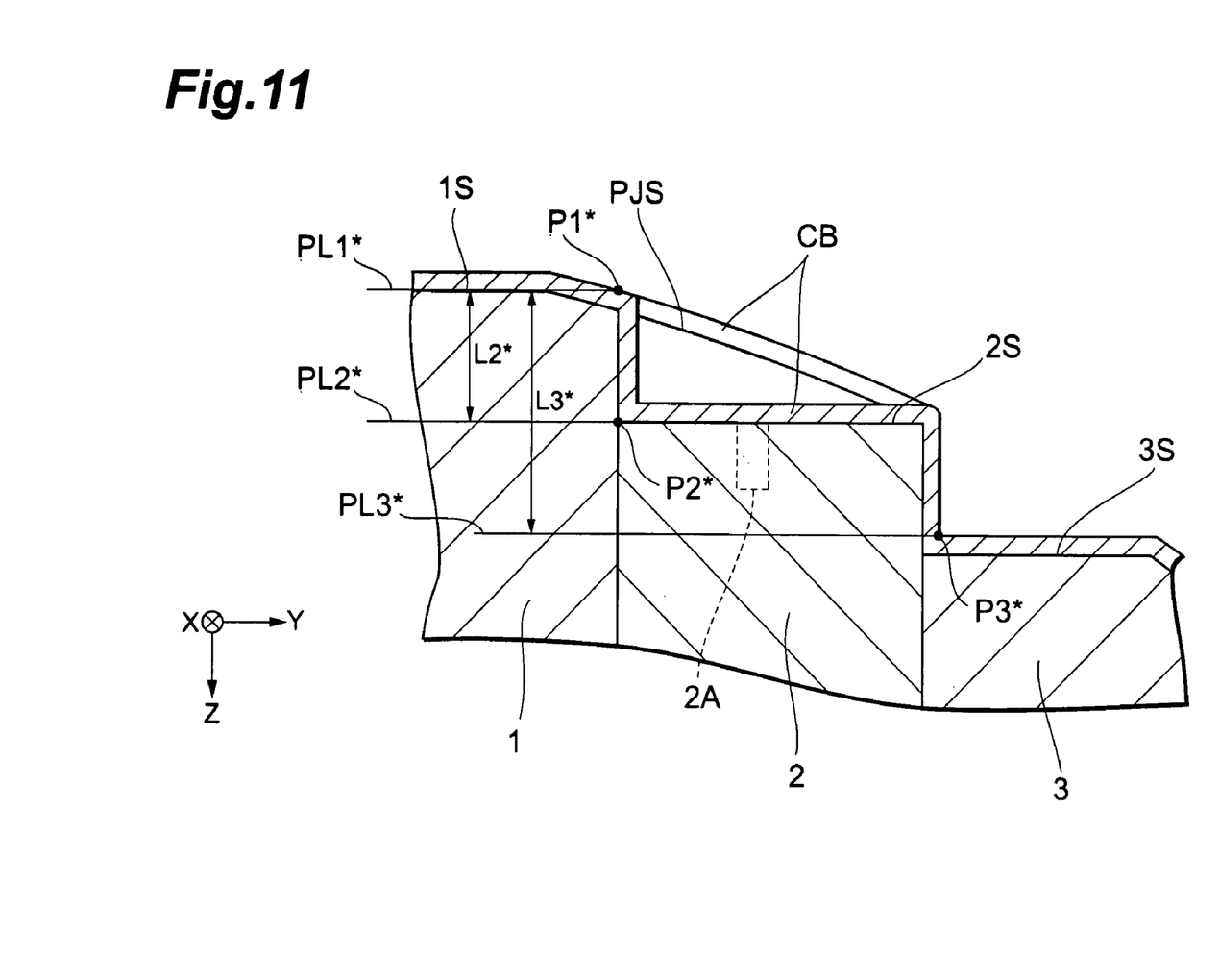
FIG. 11 is a cross-sectional view of the step portion of a magnetic tape head in a modified example; and, FIG. 12 is a cross-sectional view of the step portion of a magnetic tape head of the prior art.

FIG. 11 is a cross-sectional view of the step portion of the magnetic tape head of a modified example.

This magnetic tape head is the magnetic tape head shown in FIG. 10, with a protective film CB deposited thereupon. A protective film CB is formed not only on the tape bearing surface 2S of the magnetic head layer 2, but also on the tape bearing surface 1S of the base substrate 1 and on the tape bearing surface 3S of the closure piece 3. Even when a protective film CB is provided, the base substrate 1 and closure piece 3 are not abraded as much as or more than that shown in FIG. 9, so that the above-described distance relationship is the same.

Moreover, when the thickness of the protective film CB is taken into consideration, the following distance relationship is satisfied.

The XY plane passing through point P1* on the boundary between the protective film CB on the base substrate 1 and the protective film CB on the magnetic head layer 2 is taken to be a first plane PL1*, the XY plane passing through point P2* on the tape bearing surface 2S at this boundary is taken to be a second plane PL2*, and the distance between the planes PL1* and PL2* is L2*. The XY plane passing through point P3* on the protective layer CB positioned at the boundary between the magnetic head layer 2 and closure piece 3 is a third plane PL3 *, and the distance between planes PL1* and PL3* is L3*.

In this case also, distance L3* is greater than distance L2*, and the magnetic elements 2A positioned within the tape bearing surface 2S are positioned in the shadow of the magnetic tape traveling surface, and the above-described advantageous results are obtained. Hence degradation of the tape bearing surface 2S is suppressed. Abrasion may be further performed from the top of the protective film CB shown in FIG. 11.

Further, when a protective film CB is used as described above, by adjusting the deposition amount of the protective film CB, the interval between the magnetic elements 2A and magnetic tape can be controlled, and the effect of the precision with which the closure piece 3 is affixed can be diminished, so that manufacturing yields can be improved.

The height difference is stipulated to be $\Delta L = L3 - L2$. For convenience, if this parameter $\Delta L$ is taken to mean $\Delta L = L3' - L2'$, $\Delta L = L3'' - L2''$, $\Delta L = L3^* - L2^*$, then as an appropriate range for $\Delta L$, within which the above-described advantageous results are particularly excellent, it is preferable that $\Delta L$ be 0 or greater and 0.1 μm or less.

What is claimed is:

1. A magnetic tape head, comprising:
a base substrate;
a magnetic head layer formed on said base substrate; and
a closure piece formed on said magnetic head layer,
wherein an XYZ orthogonal coordinate system is set, taking a thickness direction of said magnetic head layer to be a Y-axis direction, a length direction of said closure piece to be an X-axis direction, and a direction perpendicular to the X-axis direction and Y-axis direction to be a Z-axis direction, and
when an XY plane passing through a point on the tape bearing surface of said base substrate positioned at a first boundary between said base substrate and said magnetic head layer is taken to be a first plane,
when an XY plane passing through a point on the tape bearing surface of said magnetic head layer positioned at the first boundary between said base substrate and said magnetic head layer is taken to be a second plane, and
when an XY plane passing through a point on the tape bearing surface of said closure piece positioned at a second boundary between said magnetic head layer and said closure piece is taken to be a third plane,
a first distance between said first plane and said third plane is greater than a second distance between said first plane and said second plane.

2. The magnetic tape head according to claim 1, wherein a line of intersection of a YZ plane with the tape bearing surface of said closure piece comprises a curve which is distended in a direction moving away from said closure piece, and a line of intersection of a YZ plane with the tape bearing surface of said base substrate comprises a curve which is distended in a direction moving away from said base substrate.

3. The magnetic tape head according to claim 1, wherein a protective film is provided on said tape bearing surface of said magnetic head layer.

4. The magnetic tape head according to claim 3, wherein said protective film is of diamond-like carbon or of $Al_2O_3$.

5. The magnetic tape head according to claim 3, wherein said protective film is provided on the tape bearing surfaces of said closure piece and said base substrate, a line of intersection of a YZ plane with an exposed surface of said protective film on said closure piece comprises a curve which is distended in a direction moving away from said closure piece, and a line of intersection of a YZ plane with an exposed surface of said protective film on said base substrate comprises a curve which is distended in a direction moving away from said base substrate.

6. The magnetic tape head according to claim 1, wherein said magnetic head layer comprises a plurality of magnetic elements, and guide walls for protection are provided between said magnetic elements.

7. The magnetic tape head according to claim 6, wherein each of said magnetic elements comprises an MR element.

* * * * *